(12) United States Patent
Hsu

(10) Patent No.: US 8,368,976 B2
(45) Date of Patent: Feb. 5, 2013

(54) AUTOMATIC DOCUMENT FEEDING AND SCANNING APPARATUS

(75) Inventor: Wei-Hsun Hsu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 359 days.

(21) Appl. No.: 12/822,748

(22) Filed: Jun. 24, 2010

(65) Prior Publication Data

US 2011/0279874 A1  Nov. 17, 2011

(30) Foreign Application Priority Data

May 14, 2010  (TW) .............................. 99115439 A

(51) Int. Cl.
*H04N 1/04* (2006.01)

(52) U.S. Cl. ......... 358/498; 358/496; 358/497; 358/474

(58) Field of Classification Search .................. 358/498, 358/496, 497, 474

See application file for complete search history.

(56) References Cited

U.S. PATENT DOCUMENTS

2010/0165424 A1 * 7/2010 Maeda .......................... 358/498

* cited by examiner

*Primary Examiner* — Houshang Safaipour
(74) *Attorney, Agent, or Firm* — Kirton McConkie; Evan R. Witt

(57) ABSTRACT

An automatic document feeding and scanning apparatus includes an automatic document feeder and a flatbed scanner mechanism. The flatbed scanner mechanism includes a casing, a scanning module and a scanning platform. The scanning platform has a first scanning window and a second scanning window for fixing a first transparent plate and a second transparent plate, respectively. In addition, an inner periphery of the second scanning window and an edge of the second transparent plate have complementary profiles.

14 Claims, 5 Drawing Sheets

AUTOMATIC DOCUMENT FEEDING AND SCANNING APPARATUS

FIELD OF THE INVENTION

The present invention relates to a scanning apparatus, and more particularly to an automatic document feeding and scanning apparatus.

BACKGROUND OF THE INVENTION

Various machines such as printers, scanners and faxing machines are common peripheral devices of a computer system. These machines are usually equipped with automatic document feeders.

FIG. 1A is a schematic cross-sectional view illustrating a conventional automatic document feeding and scanning apparatus. As shown in FIG. 1A, the scanning apparatus 1 comprises an automatic document feeder 1a and a scanner mechanism 1b. The automatic document feeder 1a is installed in an upper cover 2. The automatic document feeder 1a has an outlet 14. The use of the automatic document feeder 1a may successively feed a stack of sheet-like articles and eject the sheet-like articles out of the outlet 14.

The scanner mechanism 1b comprises a scanner casing 10, a transparent platform 11, a glass plate 12, a frame 13 and a scanning module 3. The scanner casing 10 is disposed under the automatic document feeder 1a. The scanning module 3 is disposed within the scanner casing 10.

The transparent platform 11 and the glass plate 12 are fixed in the scanner casing 10. In a case that a flatbed scanning operation is performed, the flatbed-scanning document to be scanned is supported on the transparent platform 11. The light beams emitted from the scanning module 3 are transmissible through the glass plate 12. As such, in a case that a sheetfed scanning operation is performed, the scanning module 3 may scan the sheetfed-scanning document through the glass plate 12.

FIG. 1B is an enlarged fragmentary view of FIG. 1A. The frame 13 is arranged between the transparent platform 11 and the glass plate 12. The frame 13 comprises a protrusion 13a and a vertical wall 13b. The protrusion 13a is used for supporting the glass plate 12 such that the glass plate 12 is coupled with the vertical wall 13b. By the frame 13, the transparent platform 11 and the glass plate 12 are fixed on the scanner casing 10. In addition, the frame 13 may facilitate guiding the sheetfed-scanning document to the outlet 14.

The structure for fixing the sheetfed-scanning glass plate 12, however, still has some drawbacks. Generally, the frame 13 for fixing the glass plate 12 is made of plastic material. If the frame 13 is subject to plastic deformation, the protrusion 13a may be shifted downwardly. Once the scanning module 3 is moved under the glass plate 12, the protrusion 13a is possibly hit by the moving scanning module 3. In this circumstance, the scanning module 3 fails to successfully move to the region under the transparent platform 11 to perform the scanning operation. If the protrusion 13a is removed and the glass plate 12 is directly bonded to the vertical wall 13b of the frame 13, the problem of hitting the protrusion 13a by the moving scanning module 3 could be eliminated. However, since the glass plate 12 is no longer supported by the protrusion 13a, the glass plate 12 is possibly detached from the frame 13 if the scanning apparatus has been used for a long term. In this circumstance, the use life of the automatic document feeding and scanning apparatus is shortened.

SUMMARY OF THE INVENTION

The present invention provides an automatic document feeding and scanning apparatus having an improved junction structure between the scanning window and the transparent plate to be used in a sheetfed scanning mode, so that the possibility of hitting the junction structure by the moving scanning module is minimized and the external dust is blocked from entering the internal portion of the casing.

In accordance with an aspect of the present invention, there is provided an automatic document feeding and scanning apparatus. The automatic document feeding and scanning apparatus includes an automatic document feeder and a flatbed scanner mechanism. The automatic document feeder has a sheet-feeding path for transferring a sheetfed-scanning document. The flatbed scanner mechanism is disposed under the automatic document feeder. The flatbed scanner mechanism includes a casing, a scanning module and a scanning platform. The scanning module is disposed within the casing. The scanning platform is disposed on the casing, and includes a first transparent plate and a second transparent plate. The first transparent plate is fixed in a first scanning window for supporting a flatbed-scanning document. The second transparent plate is disposed under the sheet-feeding path and fixed in a second scanning window, so that light beams generated by the scanning module are transmitted through the second transparent plate to read an image of the sheetfed-scanning document. The second transparent plate includes an upper surface and a lower surface. The area of the upper surface is greater than the area of the lower surface.

In an embodiment, a chamfer angle is formed at an edge of the second transparent plate. The second scanning window has plural inner peripheries. A beveled wall is formed on the inner periphery of the second scanning window corresponding to the chamfer angle.

In an embodiment, at least one stepped structure is formed at an edge of the second transparent plate. The second scanning window has plural inner peripheries. A wedge-shaped wall is formed on the inner periphery of the second scanning window corresponding to the stepped structure.

In an embodiment, the scanning module includes a contact image sensor (CIS).

In an embodiment, the second transparent plate is made of glass material.

In an embodiment, a double-sided tape is attached on a junction interface between the second transparent plate and the second scanning window.

In accordance with another aspect of the present invention, there is provided an automatic document feeding and scanning apparatus. The automatic document feeding and scanning apparatus includes an automatic document feeder and a flatbed scanner mechanism. The automatic document feeder has a sheet-feeding path for transferring a sheetfed-scanning document. The flatbed scanner mechanism is disposed under the automatic document feeder. The flatbed scanner mechanism includes a casing, a scanning module and a scanning platform. The scanning module is disposed within the casing. The scanning platform is disposed on the casing, and includes a first transparent plate and a second transparent plate. The first transparent plate is fixed in a first scanning window for supporting a flatbed-scanning document. The second transparent plate is disposed under the sheet-feeding path and fixed in a second scanning window, so that light beams generated by the scanning module are transmitted through the second transparent plate to read an image of the sheetfed-scanning document. A lower surface of the second transparent plate and an inner surface of the scanning platform are at the same level.

In an embodiment, the scanning module includes a contact image sensor (CIS).

In an embodiment, the second transparent plate is made of glass material.

In an embodiment, a double-sided tape is attached on a junction interface between the second transparent plate and the second scanning window.

In accordance with a further aspect of the present invention, there is provided an automatic document feeding and scanning apparatus. The automatic document feeding and scanning apparatus includes an automatic document feeder and a flatbed scanner mechanism. The automatic document feeder has a sheet-feeding path for transferring a sheetfed-scanning document. The flatbed scanner mechanism is disposed under the automatic document feeder. The flatbed scanner mechanism includes a casing, a scanning module and a scanning platform. The scanning module is disposed within the casing. The scanning platform is disposed on the casing, and includes a first transparent plate and a second transparent plate. The first transparent plate is fixed in a first scanning window for supporting a flatbed-scanning document. The second transparent plate is arranged between the sheet-feeding path and an advancing path of the scanning module and fixed in a second scanning window, so that light beams generated by the scanning module are transmitted through the second transparent plate to read an image of the sheetfed-scanning document. In addition, an inner periphery of the second scanning window and an edge of the second transparent plate have complementary profiles.

In an embodiment, the scanning module includes a contact image sensor (CIS).

In an embodiment, the second transparent plate is made of glass material.

In an embodiment, a double-sided tape is attached on a junction interface between the second transparent plate and the second scanning window.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides an automatic document feeding and scanning apparatus. According to the present invention, the junction structure between a second transparent plate and a second scanning window involving in a sheetfed scanning operation are improved in order to obviate the drawbacks encountered from the prior art.

Figure 1A:
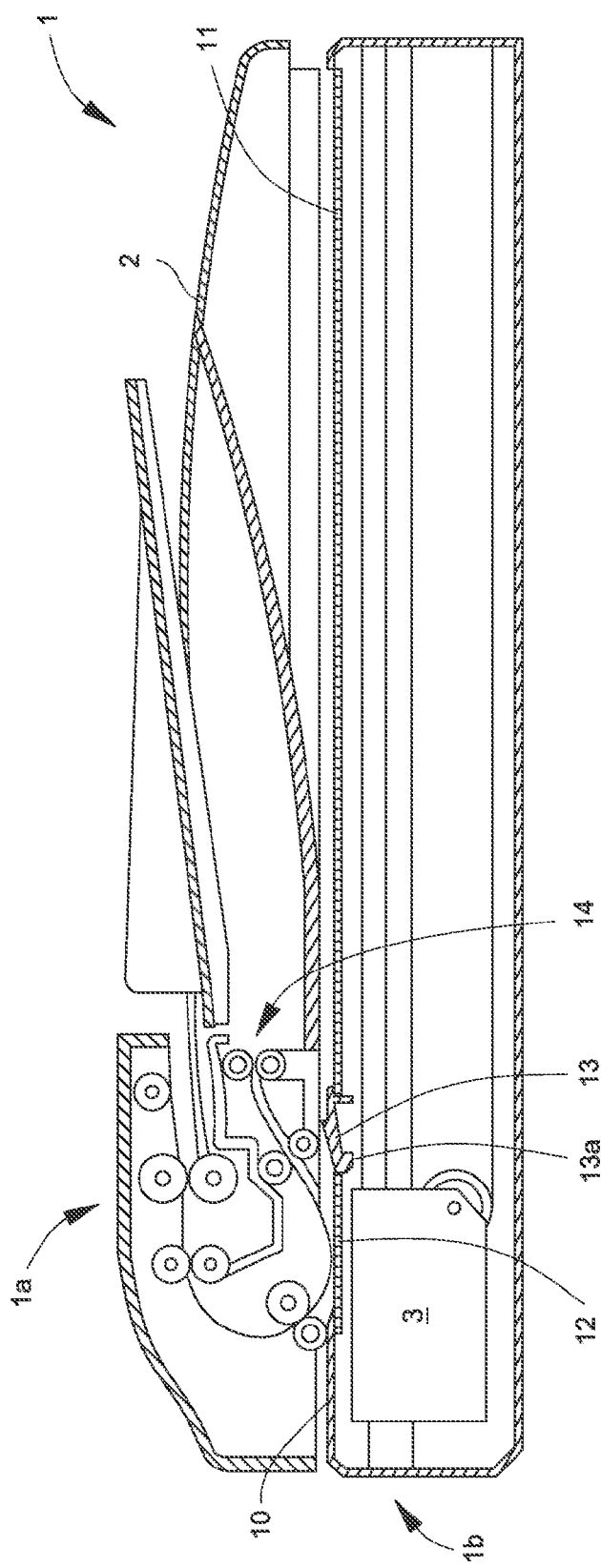
FIG. 1A is a schematic cross-sectional view illustrating a conventional automatic document feeding and scanning apparatus.
Figure 1B:
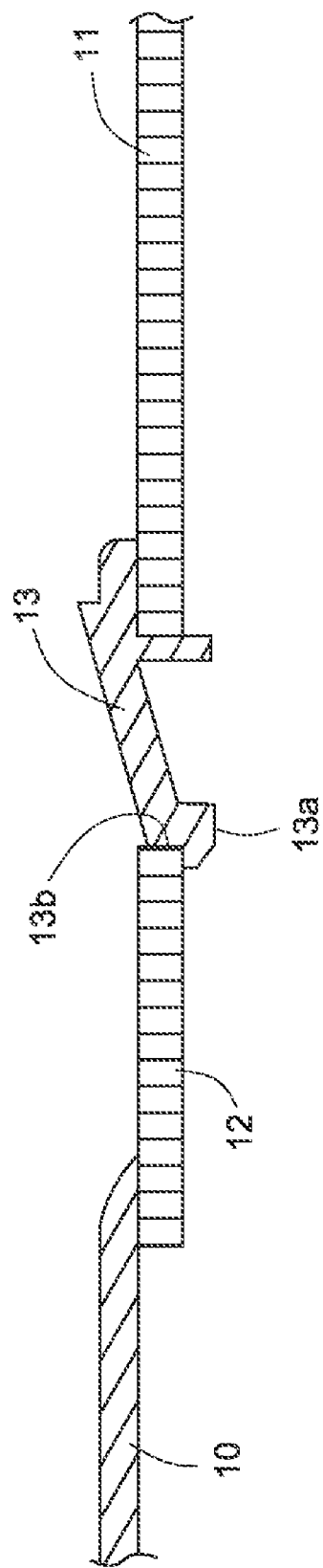
FIG. 1B is an enlarged fragmentary view of FIG. 1A.
Figure 2:
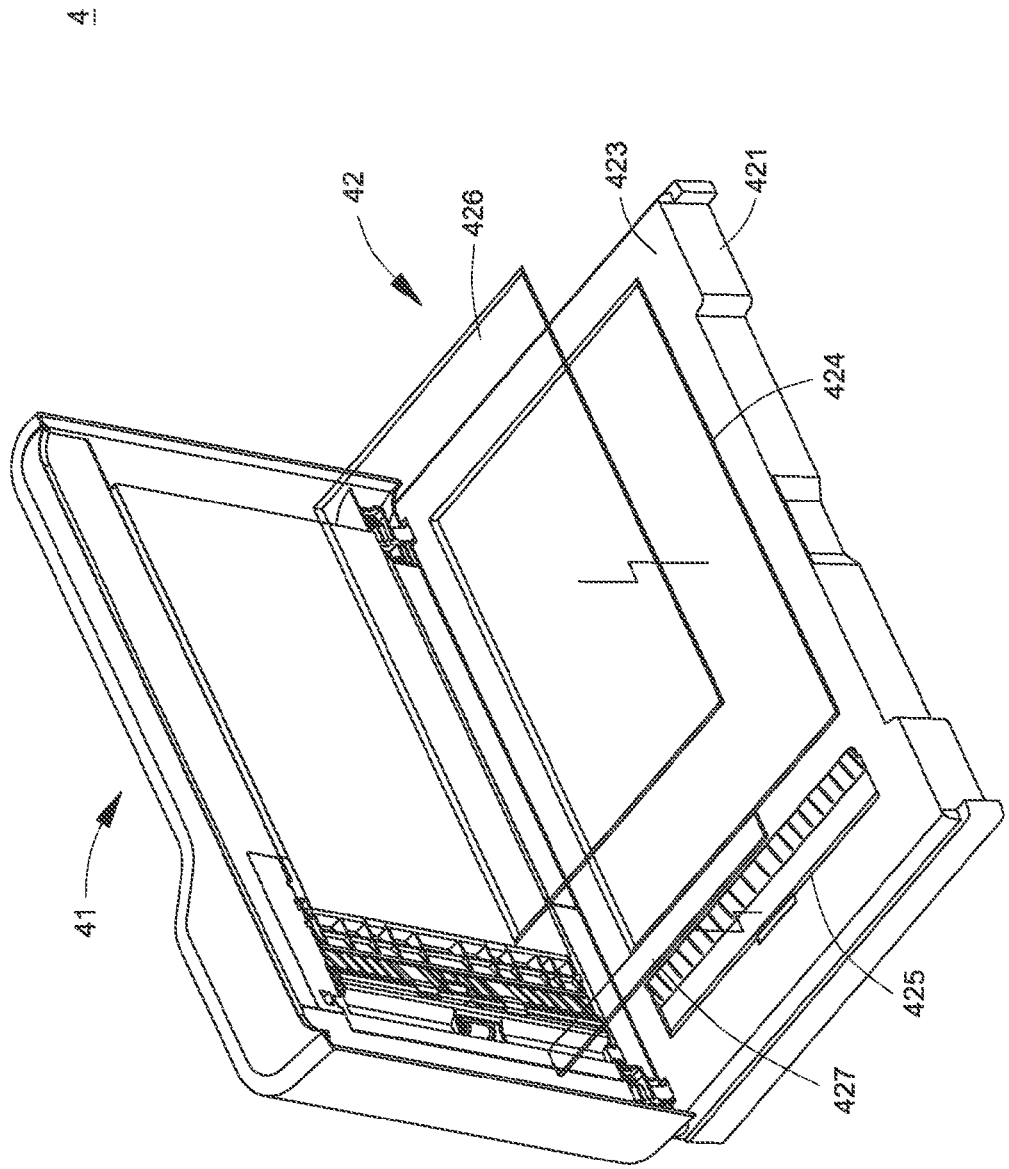
FIG. 2 is a schematic perspective view illustrating a flatbed scanner mechanism of an automatic document feeding and scanning apparatus according to a first embodiment of the present invention.
Figure 3:
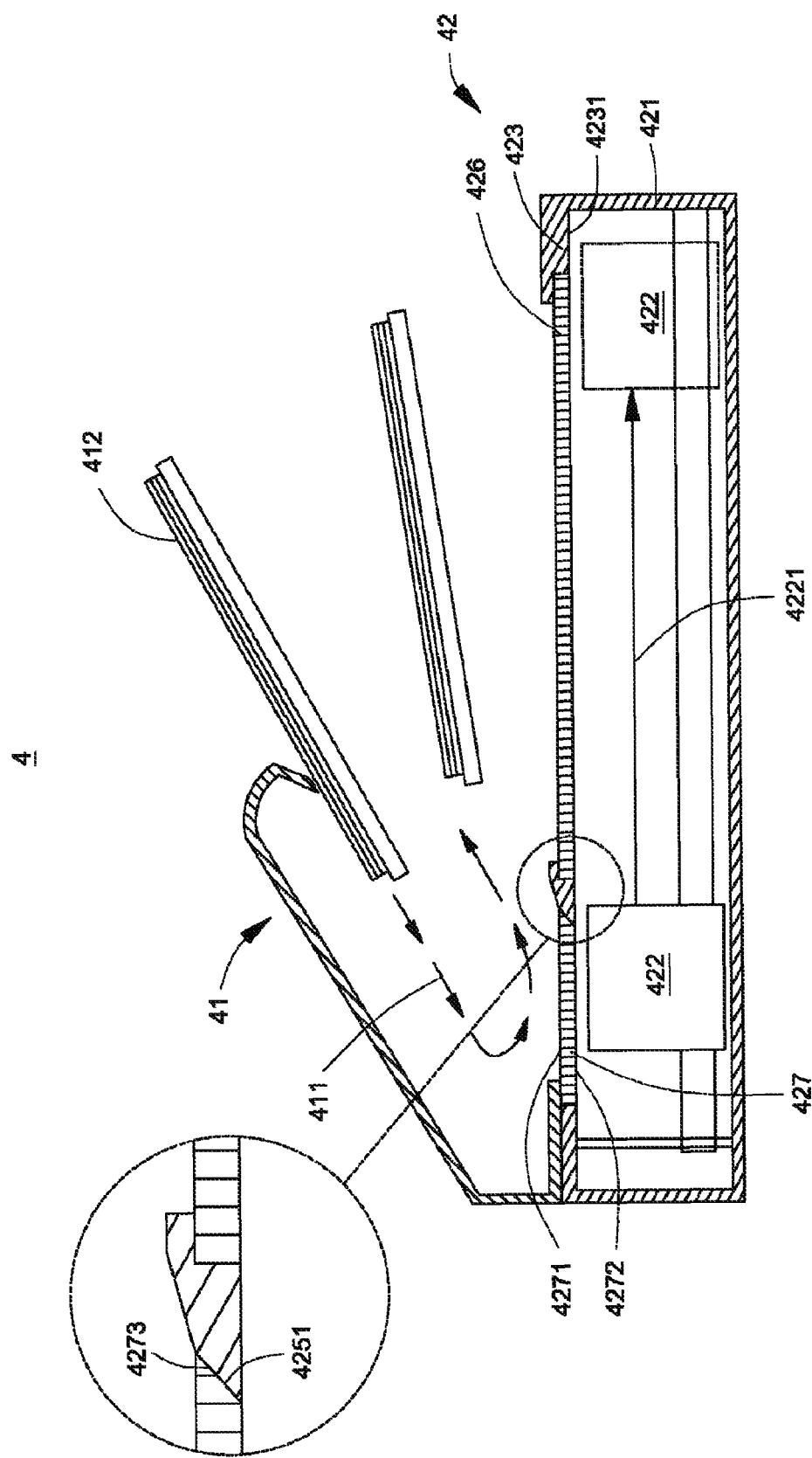
FIG. 3 is a schematic cross-sectional and side view illustrating the automatic document feeding and scanning apparatus according to the first embodiment of the present invention.

Please refer to FIGS. 2 and 3. FIG. 2 is a schematic perspective view illustrating a flatbed scanner mechanism of an automatic document feeding and scanning apparatus according to a first embodiment of the present invention. FIG. 3 is a schematic cross-sectional and side view illustrating the automatic document feeding and scanning apparatus according to the first embodiment of the present invention. For clearly illustrating the sheet-feeding path, the feeding rollers of the automatic document feeding and scanning apparatus are not shown in FIGS. 3 and 4.

As shown in FIGS. 2 and 3, the automatic document feeding and scanning apparatus 4 comprises an automatic document feeder 41 and a flatbed scanner mechanism 42. The flatbed scanner mechanism 42 is disposed under the automatic document feeder 41. The automatic document feeder 41 has a sheet-feeding path 411. For performing a sheetfed scanning operation, the documents 412 are fed into the internal portion of the automatic document feeder 41 through the sheet-feeding path 411. The flatbed scanner mechanism 42 comprises a casing 421, a scanning module 422 and a scanning platform 423. In this embodiment, the scanning module 422 includes a contact image sensor (CIS). The scanning platform 423 includes a first scanning window 424 and a second scanning window 425 for fixing a first transparent plate 426 and a second transparent plate 427, respectively. The first transparent plate 426 and the second transparent plate 427 are made of glass material. In a case that a flatbed scanning operation is performed, a flatbed-scanning document to be scanned is supported on the first transparent plate 426. The light beams emitted from the scanning module 422 are transmissible through the second transparent plate 427. As such, in a case that a sheetfed scanning operation is performed, the scanning module 422 may scan the sheetfed-scanning documents 412 through the second transparent plate 427.

Please refer to FIG. 3 again. The second transparent plate 427 comprises an upper surface 4271 and a lower surface 4272. The area of the upper surface 4271 is greater than the area of the lower surface 4272. Since the areas of the upper surface 4271 and the lower surface 4272 are different, a chamfer angle 4273 is formed at an edge of the second transparent plate 427. In this embodiment, the chamfer angle 4273 of the second transparent plate 427 is formed at the edge neighboring the outlet of the sheet-feeding path 411. Corresponding to the chamfer angle 4273, a beveled wall 4251 is formed on the inner periphery of the second scanning window 425. In this embodiment, a double-sided tape (not shown) is attached on a junction interface between the chamfer angle 4273 and the beveled wall 4251. Via the double-sided tape, the second transparent plate 427 is fixed. It is preferred that the lower surface 4272 of the second transparent plate 427 and the inner surface 4231 of the scanning platform 423 are at the same level. According to the specific design, the advancing path 4221 of the scanning module 422 will not be hindered, and thus the scanning module 422 is closer to the scanning platform 423 for enhancing the imaging quality of the scanning module 422.

Figure 4:
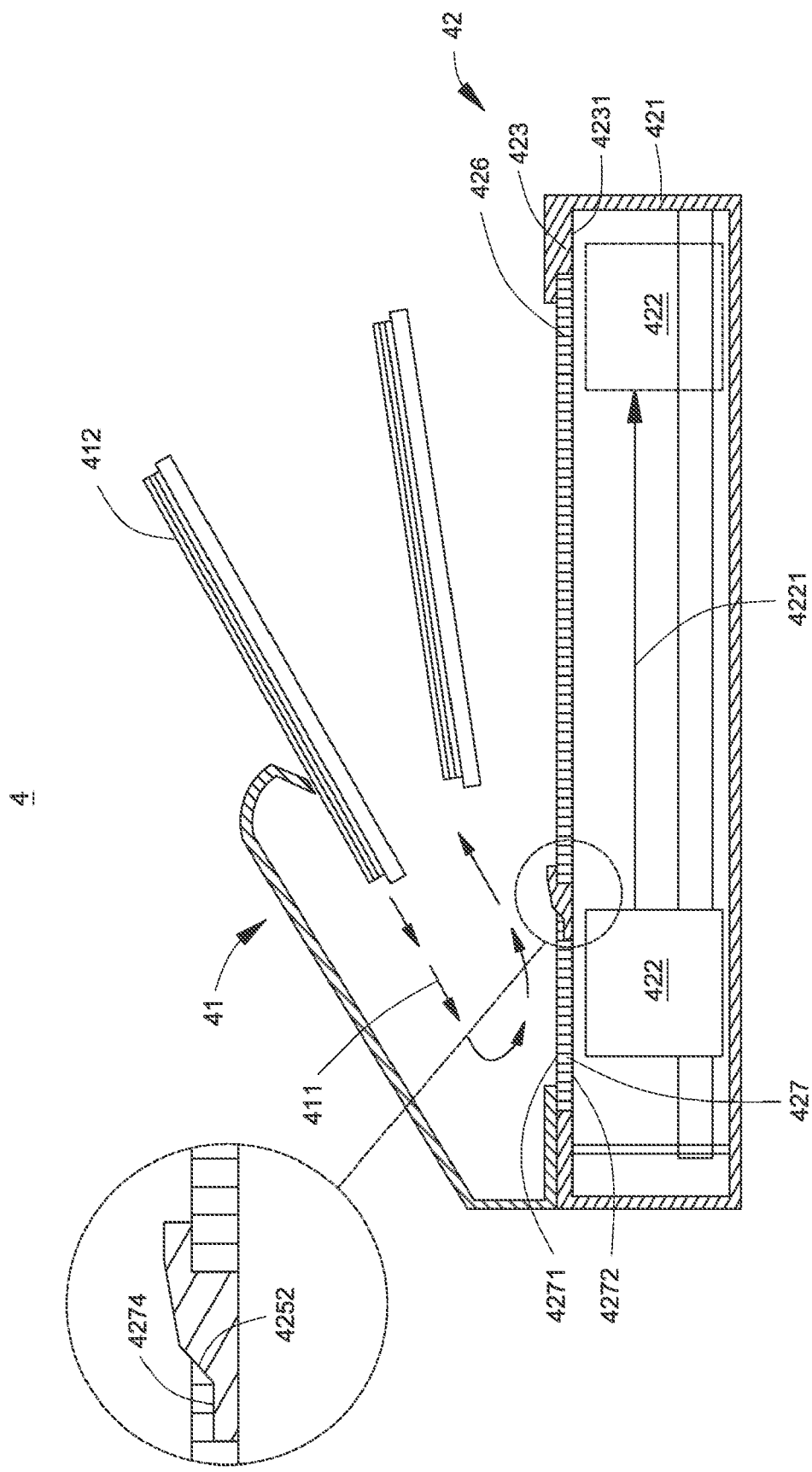
FIG. 4 is a schematic cross-sectional and side view illustrating an automatic document feeding and scanning apparatus according to a second embodiment of the present invention.

FIG. 4 is a schematic cross-sectional and side view illustrating an automatic document feeding and scanning apparatus according to a second embodiment of the present invention. The second transparent plate 427 comprises an upper surface 4271 and a lower surface 4272. The area of the upper surface 4271 is greater than the area of the lower surface 4272. Since the areas of the upper surface 4271 and the lower surface 4272 are different, a stepped structure 4274 is formed at an edge of the second transparent plate 427. In this embodiment, the stepped structure 4274 of the second transparent plate 427 is formed at the edge neighboring the outlet of the sheet-feeding path 411. Corresponding to the stepped structure 4274, a wedge-shaped wall 4252 is formed on the inner periphery of the second scanning window 425. In this embodiment, a double-sided tape (not shown) is attached on a junction interface between the stepped structure 4274 and the wedge-shaped wall 4252.

From the above description, in the scanning platform of the automatic document feeding and scanning apparatus of the present invention, the inner periphery of the second scanning window 425 and the edge of the second transparent plate 427 have complementary profiles. Due to the complementary profiles, the second transparent plate 427 is securely fixed in the second scanning window 425 without hindering the advancing path 4221 of the scanning module 422. Moreover, since a double-sided tape is attached on a junction interface between the second transparent plate 427 and the second scanning window 425, the second transparent plate 427 and the second scanning window 425 are structurally strengthened and the external dust is blocked from entering the internal portion of the casing 421 through the seam. In this circumstance, the scanning quality is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An automatic document feeding and scanning apparatus, comprising:
    an automatic document feeder having a sheet-feeding path for transferring a sheetfed-scanning document; and
    a flatbed scanner mechanism disposed under said automatic document feeder, and comprising:
        a casing;
        a scanning module disposed within said casing; and
        a scanning platform disposed on said casing, and comprising a first transparent plate and a second transparent plate, wherein said first transparent plate is fixed in a first scanning window for supporting a flatbed-scanning document, and said second transparent plate is disposed under said sheet-feeding path and fixed in a second scanning window, so that light beams generated by said scanning module are transmitted through said second transparent plate to read an image of said sheetfed-scanning document, wherein said second transparent plate comprises an upper surface and a lower surface, and the area of said upper surface is greater than the area of said lower surface.

2. The automatic document feeding and scanning apparatus according to claim 1 wherein a chamfer angle is formed at an edge of said second transparent plate, said second scanning window has plural inner peripheries, and a beveled wall is formed on said inner periphery of said second scanning window corresponding to said chamfer angle.

3. The automatic document feeding and scanning apparatus according to claim 1 wherein at least one stepped structure is formed at an edge of said second transparent plate, said second scanning window has plural inner peripheries, and a wedge-shaped wall is formed on said inner periphery of said second scanning window corresponding to said stepped structure.

4. The automatic document feeding and scanning apparatus according to claim 1 wherein said scanning module includes a contact image sensor (CIS).

5. The automatic document feeding and scanning apparatus according to claim 1 wherein said second transparent plate is made of glass material.

6. The automatic document feeding and scanning apparatus according to claim 1 wherein a double-sided tape is attached on a junction interface between said second transparent plate and said second scanning window.

7. An automatic document feeding and scanning apparatus, comprising:
    an automatic document feeder having a sheet-feeding path for transferring a sheetfed-scanning document; and
    a flatbed scanner mechanism disposed under said automatic document feeder, and comprising:
        a casing;
        a scanning module disposed within said casing; and
        a scanning platform disposed on said casing, and comprising a first transparent plate and a second transparent plate, wherein said first transparent plate is fixed in a first scanning window for supporting a flatbed-scanning document, and said second transparent plate is disposed under said sheet-feeding path and fixed in a second scanning window, so that light beams generated by said scanning module are transmitted through said second transparent plate to read an image of said sheetfed-scanning document, wherein a lower surface of said second transparent plate and an inner surface of said scanning platform are at the same level, wherein a chamfer angle is formed at an edge of said second transparent plate, said second scanning window has plural inner peripheries, and a beveled wall is formed on said inner periphery of said second scanning window corresponding to said chamfer angle.

8. The automatic document feeding and scanning apparatus according to claim 7 wherein said scanning module includes a contact image sensor (CIS).

9. The automatic document feeding and scanning apparatus according to claim 7 wherein said second transparent plate is made of glass material.

10. The automatic document feeding and scanning apparatus according to claim 7 wherein a double-sided tape is attached on a junction interface between said second transparent plate and said second scanning window.

11. An automatic document feeding and scanning apparatus, comprising:
    an automatic document feeder having a sheet-feeding path for transferring a sheetfed-scanning document; and
    a flatbed scanner mechanism disposed under said automatic document feeder, and comprising:
        a casing;
        a scanning module disposed within said casing; and
        a scanning platform disposed on said casing, and comprising a first transparent plate and a second transparent plate, wherein said first transparent plate is fixed in a first scanning window for supporting a flatbed-scanning document, and said second transparent plate is arranged between said sheet-feeding path and an advancing path of said scanning module and fixed in a second scanning window, so that light beams generated by said scanning module are transmitted through said second transparent plate to read an image of said sheetfed-scanning document, wherein an inner periphery of said second scanning window and an edge of said second transparent plate have complementary profiles, wherein at least one stepped structure is formed at an edge of said second transparent plate, said second scanning window has plural inner peripheries, and a wedge-shaped wall is formed on said inner periphery of said second scanning window corresponding to said stepped structure.

12. The automatic document feeding and scanning apparatus according to claim 11 wherein said scanning module includes a contact image sensor (CIS).

13. The automatic document feeding and scanning apparatus according to claim 11 wherein said second transparent plate is made of glass material.

14. The automatic document feeding and scanning apparatus according to claim 11 wherein a double-sided tape is attached on a junction interface between said second transparent plate and said second scanning window.

* * * * *